United States Patent

[11] 3,566,835

[72] Inventors George A. Grindahl;
Ogen R. Pierce; John R. Greenwald,
Midland, Mich.
[21] Appl. No. 771,291
[22] Filed Oct. 28, 1968
[45] Patented Mar. 2, 1971
[73] Assignee Dow Corning Corporation
Midland, Mich.

[54] PERFLUOROALKYLENE ETHER AND THIOETHER TRIAZINE COMPOUNDS
7 Claims, No Drawings
[52] U.S. Cl. .................................................. 260/248,
260/78.4, 260/564
[51] Int. Cl. ................................................ C07d 55/50
[50] Field of Search............................................ 260/248
(CS) (Chemical Abstracts 1907—June 1969)

[56] References Cited
UNITED STATES PATENTS
3,317,484  5/1967  Fritz et al. ...................... 260/248X
3,453,275  7/1969  Grindahl et al. ................ 260/248

*Primary Examiner*—John M. Ford
*Attorneys* — Robert F. Fleming, Jr, Laurence R. Hobey and Harry D. Dingman ABSTRACT: The invention provides triazines of the formula

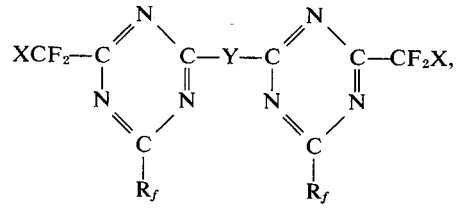

Y being a perfluoroalkylene radical containing at least one ether or thioether linkage, $R_f$ being a monovalent polyfluorinated hydrocarbon radical of no more than 12 carbon atoms, X being bromine or iodine. Triazine polymers of these compounds are also disclosed, as heat-stable elastomers.

PERFLUOROALKYLENE ETHER AND THIOETHER TRIAZINE COMPOUNDS

This invention relates to novel triazines. In one aspect the invention relates to polymeric fluorine-containing triazines, which have utility as thermally and oxidatively stable elastomer ingredients, sealants, resins, oils and coatings. These polymeric triazines also exhibit a high degree of solvent resistance and retain their properties at low temperatures.

Polymeric triazines are known in the prior art. More particularly, U.S. Pat. No. 3,317,484 discloses three-dimensional polymers having perfluoroether linkages from each carbon atom in the triazine ring. These polymers are obtained by the trimerization of three dinitriles to form the ring. The present invention provides a linear triazine polymer which contains only one perfluoroether or thioether linkage between triazine rings.

It is an object of the invention to provide linear triazine polymers containing ether or thioether linkage.

Another object of the invention is to provide an elastomeric polymer which is thermally stable.

These and other objects will be apparent to one skilled in the art upon consideration of the following specification and appended claims.

According to the invention, there are provided triazine compounds of the formula I 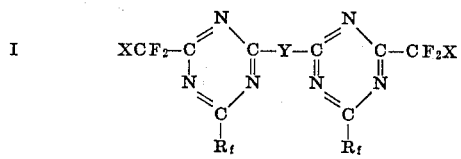

where Y is a perfluoroalkylene radical containing at least one ether or thioether linkage.

$R_f$ is a monovalent polyfluorinated hydrocarbon radical of no more than 12 carbon atoms, and X is bromine or iodine.

Rf can be any suitable monovalent fluorhydrocarbon radical, such as, perfluoroalkyl, for example, trifluoromethyl, iso(heptafluoropropyl), perfluoroisobutyl, perfluorooctyl or perfluorodecyl; unsaturated fluorocarbon radicals, for example, pentafluorallyl and 4-perfluorohexenyl; perfluorocycloaliphatic radicals such as perfluorocyclohexyl, perfluorocyclopentyl; or any aryl-containing radical, for example, pentafluorophenyl, nonafluoroxenyl, heptafluorotolyl, heptafluoronaphthyl, heptafluorobenzyl or β-perfluoro-β-phenylethyl. Also included are monovalent hydrocarbon radicals partially substituted with fluorine such a trifluoroethyl and 3,3,3,-trifluoropropyl.

$R_f$ is preferably trifluoromethyl, trifluoroethyl or other fluoroalkyl radical. The presence of small amounts of fluoroolefinic radicals provides crosslinking sites in polymers of the above-described triazines.

As described above, Y is a perfluoroalkylene radical containing at least one ether or thioether linkage. Representative of ether linkages are compounds of the general formulas

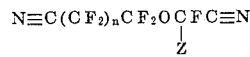

where $n$ is an integer of from 0 to 12,

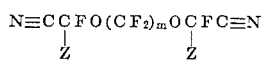

where $m$ is an integer of from 2 to 12,

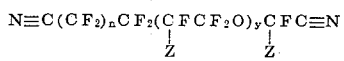

where $y$ is an integer of from 0 to 100 and $n$ is as defined above,

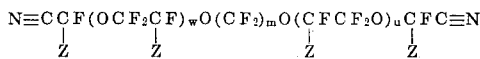

where $m$ is an integer of from 2 to 12, and $u + w$ is an integer of 0 to 100. In each of the above structural formulas Z is fluorine or a -$CF_3$ radical.

Representative of the perfluoroalkylene radicals containing at least one thioether linkage are compounds having the general structures $(-CF_2-)_a S(-CF_2-)_a$ where $a$ is an integer of from 1 to 3 and $(-CF_2-)_a S(-CF_2-)_b S(-CF_2-)_a$ where $a$ is an integer of 1 to 3 and $b$ is an integer of from 2 to 6.

The two X groups in the above-defined triazine provide coupling sites for the synthesis of polymers, thus the compounds have particular utility as precursors for linear triazine polymers.

Further in accordance with the invention, there are provided linear polymeric triazine compounds consisting essentially of units of the formula II 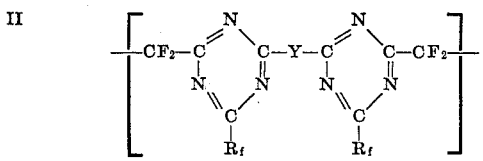

where
$R_f$ and Y are as defined above.

The triazine compounds (I) can be prepared by two methods. In the first method, the addition of excess ammonia to perfluoroether- or perfluorothioether-dinitriles results in the formulation of a diamidine compound. After removal of excess ammonia, the addition of bromo- or iododifluoroacetonitrile thereof forms a diimidoylamidine. Acylation and cyclodehydration of the diimidoylamidine by reaction with a fluorinated acid anhydride gives the triazine compound (I) of the invention. The reaction sequence is as follows:

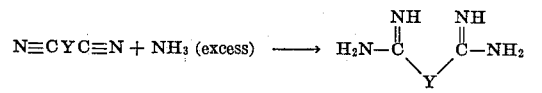

and

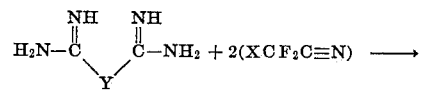

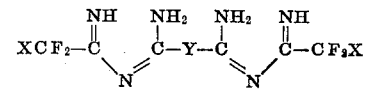

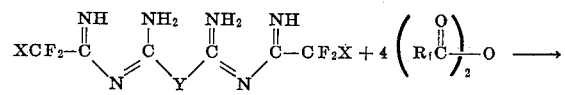

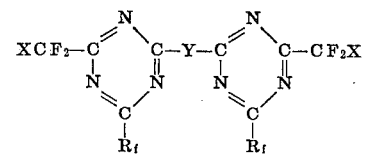

The dinitrile starting materials can be synthesized from perfluoro oxa- and thiaglutaric acids. Also suitable perfluoroether-dinitriles and a method for their preparation are disclosed in U.S. Pat. No. 3,317,484.

In the second method, bromo- or iododifluoroacetonitrile is reacted with ammonia to form an amidine which in turn is reacted with a polyfluorinated nitrile to form an imidoylamidine. Addition of a diacid chloride containing the perfluoroalkylene radical having ether or thioether linkages acylates the imidoylamidines to give a product, which when treated with an acid anhydride or excess diacid chloride cyclodehydrates to give the triazine compound (I). The reactions are as follows:

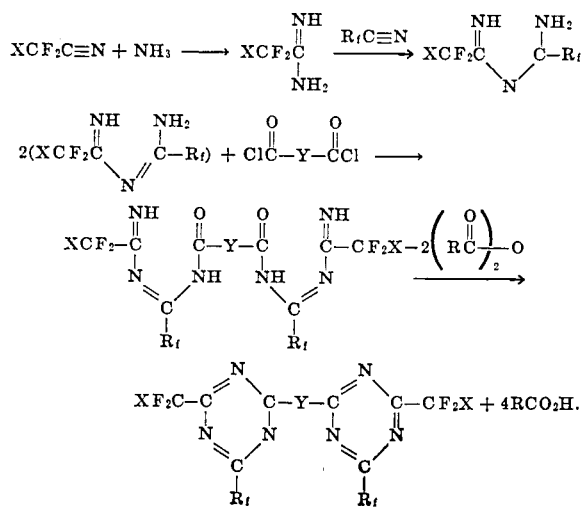

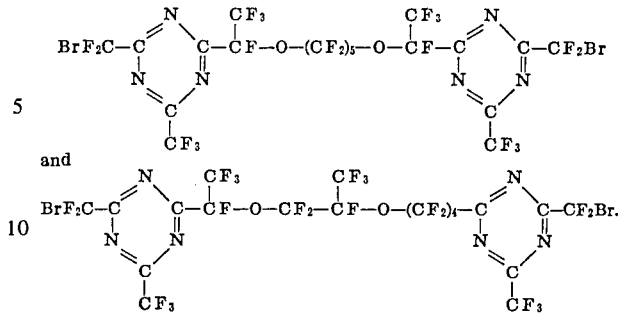

and

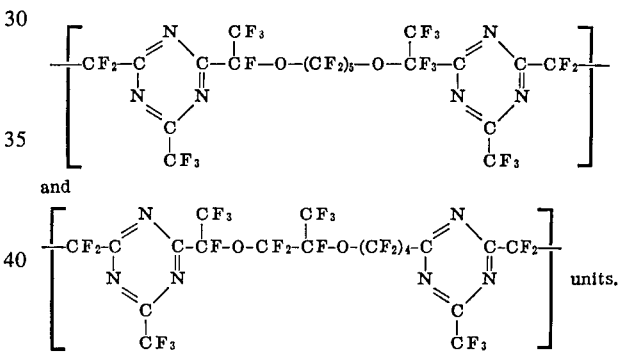

The mixture was washed 3 times with one-liter portions of water and then dried. Evaporation of the methylene chloride gave 85 grams of oil which showed triazine absorption in the infrared region.

EXAMPLE 2

64.7 grams of the triazine monomer mixture obtained in example 1 and 437 grams of mercury were heated for 3 days at 230°—° C. At the end of this time, 70 grams of crude polymer, a yellow rubbery material, were obtained. The polymer was heated under vacuum to remove the mercury residue. The purified product was a polymer containing Analysis was as follows: Calculated for $(-C_{19}F_{28}N_6O_2-)$; C, 26.0; F, 60.75; N. 9.6. Found: C, 25.7; F, 65.7; N, 8.80.

100 parts of the polymer were milled with 5 parts of tetraphenyl tin (crosslinking agent). The sample was vulcanized in a press for 16 hours at 160° C. The properties of the vulcanized polymer are given below:

Stress (p.s.i.)        10 21 25 29 39 48 58*
Strain (percent)       20 40 50 60 80 100 120

*sample failed

This example demonstrates the preparation of the elastomeric triazine polymers of the invention.

EXAMPLE 3

200 milliliters of ammonia were condensed in a flask and allowed to warm to reflux. Bromodifluoroacetonitrile (88 grams) was evaporated into the flask. Excess ammonia was removed under vacuum. After removal of the ammonia, 200 milliliters of methylene chloride were added and this slurry was stirred while 21.7 grams of β-oxaperfluoroglutaronitrile in 100 milliliters of methylene chloride were rapidly added. The addition was accomplished in 5 minutes. Some warming was evident; the mixture was intermittently cooled to maintain the reaction mixture at about 25° C. A solution of 430 grams of trifluoroacetic anhydride 200 milliliters of methylene chloride which had been cooled to a −10° C. was added to the This mixture was stirred for one-half hour and then poured into 2 liters of water at 0° C.

The bromodifluoroacetonitriles are known in the art and methods of their preparation involve known processes. Iododifluoroacetonitrile and homologues thereof can be prepared in accordance with U.S. application Ser. No. 467,110, filed Jun. 25, 1965, by William X. Bajzer, now abandoned.

The linear triazine polymers (II) are produced by condensing the triazine monomer (I). This condensation is effected by heating the defined triazine monomers to a temperature of at least 30° C. in the presence of mercury. The temperature at which the condensation takes place varies depending on the reaction conditions. When ultraviolet light is employed, the reaction occurs at 30° C. or above, preferably 50° C. or above. When heat alone is used, the reaction goes best at 150° C. or above. Of course, the reaction temperature should be below the decomposition temperature of the triazine. In the absence of ultraviolet light the reaction temperature is generally 200° to 300° C. This process can be performed at any suitable pressure and is preferably carried out in an inert atmosphere.

The following examples are illustrative of the invention which is properly delineated in the appended claims.

EXAMPLE 1

Approximately 500 milliliters of anhydrous ammonia were condensed in a cooled flask. While maintaining the ammonia at −70° C., 51.8 grams (0.097 mole) of a mixture of isomeric dinitriles ($C_{11}F_{18}O_2N_2$) were added dropwise over a 1-hour period. Cooling was stopped and the ammonia allowed to evaporate. Residual ammonia was removed by evacuating the flask for 1 hour. The product was a mixture of

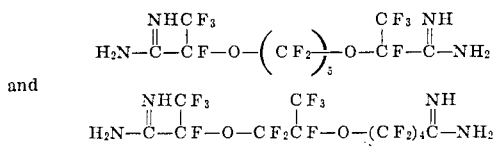

Dry methylene chloride (400 milliliters) was added to the mixture, the slurry was cooled to 0° C., and 50 grams of bromodifluoroacetonitrile were added to produce a mixture of diimidoylamidines. After stirring overnight, 105 grams (0.5 mole) of trifluoroacetic anhydride were slowly added. Reaction of the diimidoylamides with the acid anhydride produced a mixture of the following triazines The organic layer was washed, dried, filtered and concentrated by distilling the solvent. The residue was distilled under vacuum to yield the product, $$CF_2Br-C\underset{\underset{C}{\underset{\|}{N}}}{\overset{\overset{N}{\|}}{\diagdown}}\diagup C-CF_2OCF_2-C\underset{\underset{C}{\underset{\|}{N}}}{\overset{\overset{N}{\|}}{\diagdown}}\diagup C-CF_2Br$$
$$\overset{|}{CF_3} \qquad \overset{|}{CF_3}$$

having a boiling point of 93°—97° C./1 mm. Hg. and an $n_D^{25}$ of 1.4175. The infrared spectrum showed the characteristic triazine adsorption.

EXAMPLE 4

Thionyl chloride, 100 milliliters (162 grams) was cooled 10° C. and treated with 61.4 grams (0.276 mole) of β-thiaperfluoroglutaric acid, in small increments. There was no exothermic reaction so the temperature was increased to 25° C. for 20 hours. Wet pyridine, 0.05 milliliters, was added and the reaction mixture was heated slowly to reflux and kept there for 6 hours. Fractionation of the product mixture gave unreacted thionyl chloride and 63.9 grams of β-thiaperfluoroglutaryl chloride, having a boiling point of 57.5°—58.5° C. at 45 mm./Hg.

Analysis: calculated for $C_4Cl_2F_4O_2S$: %C., 18.55; %F., 29.34; %Cl, 27.38; Found: %C., 18.8; %F., 30.1; %Cl, 26.9.

Bromodifluoroacetamidine, 1.24 moles, was prepared by adding 194 grams (1.24 moles) of bromodifluoroacetonitrile to an excess of liquid $NH_3$ at −65° C. and then removing the excess of $NH_3$ by evaporation until a white free-flowing powder resulted. This solid was suspended in 500 milliliters of dry $CH_2Cl_2$ at −75° C. and treated with 165 grams of $CF_3CN$ over the temperature range −75° to +25° C. The solution of bromodifluoroacetimidoyl-N-trifluoroacetamidine was cooled to 5° C. and treated with 59.8 grams (0.24 mole) of β-thiaperfluoroglutaryl chloride dropwise over a period of 1 hour. An additional 50 milliliters of dry $CH_2Cl_2$ was added to facilitate stirring. The pasty mixture was then treated with 440 grams (2.1 moles) of trifluoroacetic anhydride to effect cyclodehydration. After a brief period of refluxing to ensure complete ring closure, the solution was cooled and poured onto ice. The organic phase plus $CH_2Cl_2$ extracts of the aqueous phase were combined, dried, and fractionated to yield 50.0 grams of α,ω-di-(4-bromodifluoromethyl-6-trifluoromethyl-s-triazinyl)-β-thiaperfluoropropane having a boiling point of 75°—76° C./0.15 mm. Hg.

Analysis: calculated for $C_{12}F_{14}Br_2SN_6$: %C., 21.01; Found: %C., 20.95.

$^{19}F$ n.m.r. spectroscopy ($CFCl_3$ reference) shows three singlets at 59.9 p.p.m. ($CF_2Br$, 2.0), 72.2 p.p.m. ($CF_3$, 3.1), 75.5 p.p.m. ( $\overset{\diagdown}{\diagup}C-CF_2-S-$, 2.0) in agreement with the proposed structure. Infrared spectroscopy reveals the typical triazine absorption at 6.46μ.

EXAMPLE 5

Mercury, 223.4 grams (excess) and the monomer, 7.2 grams, of example 4, were heated and stirred under a nitrogen atmosphere. The temperature was gradually increased from 195° C. (24 hours) to 250° C. (4 hours) to 275° C. (2 hours) where polymerization occurred. The reaction mass was cooled, extracted with $CH_2Cl_2$ and the extract was devolitilized to yield 3.8 grams of a brown, fluid polymer that was brittle at −20°C. The insoluble polymer, 1.06 grams was purified by a sequence of freezing, pulverizing and heating under vacuum to sublime mercury and mercury salts. The product was a linear polymer of the following units:

$$\left[-CF_2-C\underset{\underset{C}{\underset{\|}{N}}}{\overset{\overset{N}{\|}}{\diagdown}}\diagup C-CF_2SCF_2-C\underset{\underset{C}{\underset{\|}{N}}}{\overset{\overset{N}{\|}}{\diagdown}}\diagup C-CF_2-\right]$$
$$\overset{|}{CF_3} \qquad \overset{|}{CF_3}$$

The brown, tack-free polymer was elastomeric at room temperature but brittle at −20° C. When heated in nitrogen at a rate of 17° C. per minute, a sample of insoluble polymer experienced a 10 percent weight loss at 312° C. and a 50 percent weight loss at 390° C.

We claim:

1. A compound of the formula $$XCF_2-C\underset{\underset{C}{\underset{\|}{N}}}{\overset{\overset{N}{\|}}{\diagdown}}\diagup C-Y-C\underset{\underset{C}{\underset{\|}{N}}}{\overset{\overset{N}{\|}}{\diagdown}}\diagup C-CF_2X$$
$$\overset{|}{R_f} \qquad \overset{|}{R_f}$$

where
 $R_f$ is a monovalent polyfluorinated hydrocarbon radical containing from 1 to 12 inclusive carbon atoms;
 X is a bromine or iodine atom; and
 Y is a perfluoroalkylene radical containing at least one ether or thioether linkage selected from the group consisting of $$-C(CF_2)_nCF_2OCFC-$$
$$\qquad\qquad\qquad\overset{|}{Z}$$

where $n$ is an integer of from 0 to 12;

$$-CCFO(CF_2)_mOCFC-$$
$$\overset{|}{Z}\qquad\qquad\overset{|}{Z}$$

where $m$ is an integer of from 2 to 12;

$$-C(CF_2)_nCF_2O(CFCF_2O)_yCFC-$$
$$\qquad\qquad\qquad\overset{|}{Z}\qquad\qquad\overset{|}{Z}$$

where $y$ is an integer of from 0 to 100 and $n$ is an integer of from 0 to 12;

$$-CCF(OCF_2CF)_wO(CF_2)_wO(CFCF_2O)_uCFC-$$
$$\overset{|}{Z}\quad\overset{|}{Z}\qquad\qquad\quad\overset{|}{Z}\qquad\overset{|}{Z}$$

where $m$ is an integer of from 2 to 12, $u + w$ is an integer of from 0 to 100, Z being fluorine or a $CF_3$ radical; $(-CF_2-)aS(-CF_2-)_a$ where $a$ is an integer of from 1 to 3; and $(-CF_2-)_aS(-CF_2-)_bS(-CF_2-)_a$ where $a$ is an integer of from 1 to 3 and $b$ is an integer of from 2 to 6.

2. A compound of claim 1 where Y is a perfluoroalkylene radical containing at least one ether linkage selected from the group consisting of $$-C(CF_2)_nCF_2OCFC-\text{ where }n\text{ is an integer of from 0 to 12;}$$
$$\qquad\qquad\qquad\overset{|}{Z}$$

$$-CCFO(CF_2)_mOCFC-\text{ where }m\text{ is an integer of from 2 to 12;}$$
$$\overset{|}{Z}\qquad\qquad\overset{|}{Z}$$

$$-C(CF_2)_nCF_2O(CFCF_2O)_yCFC-\text{ where }y\text{ is an integer of from 0}$$
$$\qquad\qquad\qquad\overset{|}{Z}\qquad\qquad\overset{|}{Z}$$

to 100 and $n$ is an integer of from 0 to 12; and $$-CCF(OCF_2CF)_wO(CF_2)_wO(CFCF_2O)_uCFC-\text{ where }m\text{ is an}$$
$$\overset{|}{Z}\quad\overset{|}{Z}\qquad\qquad\quad\overset{|}{Z}\qquad\overset{|}{Z}$$

integer of from 2 to 12; $u + w$ is an integer of from 0 to 100, Z being fluorine or a $CF_3$ radical.

3. A compound of claim 2 where Y is a $$-CF-O-(CF_2)_5-O-CF-$$
$$\overset{|}{CF_3}\qquad\qquad\qquad\overset{|}{CF_3}$$

radical.

4. A compound of claim 2 where Y is a -CF$_2$-O-CF$_2$ radical.

5. A compound of claim 2 where Y is a

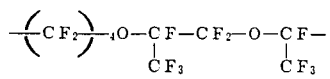

radical.

6. A compound of claim 1 where Y is a perfluoroalkylene radical containing at least one thioether linkage selected from the group consisting of (-CF$_2$-)$_a$S(-CF-)$_a$ where $a$ is an integer of from 1 to 3 ; and (-CF$_2$-)$_a$S-(CF$_2$-)$_b$S(-CF$_2$-)$_a$ where $a$ is an integer of from 1 to 3 and $b$ is an integer of from 2 to 6.

7. A compound of claim 6 where Y is a -CF$_2$-S-CF$_2$- radical.